United States Patent [19]
Stultz

[11] Patent Number: 5,453,179
[45] Date of Patent: Sep. 26, 1995

[54] SLUDGE CLARIFIER ROOF WITH CENTRAL COLUMN SUPPORT

[75] Inventor: Jeffrey H. Stultz, Freeport, Tex.

[73] Assignee: The Dow Chemical Company, Midland, Mich.

[21] Appl. No.: 55,154

[22] Filed: Apr. 29, 1993

[51] Int. Cl.$^6$ .................................................. B01D 21/30
[52] U.S. Cl. ............................ 210/97; 210/218; 210/539; 210/DIG. 9; 220/218; 220/220
[58] Field of Search ............................ 210/97, 188, 218, 210/532.1, 539, DIG. 9, 916; 220/203, 218, 227, 220, 216

[56] References Cited

U.S. PATENT DOCUMENTS

| | | | |
|---|---|---|---|
| 2,132,837 | 10/1938 | Talbot | 210/DIG. 9 |
| 2,172,646 | 9/1939 | Walker | 261/112 |
| 2,211,565 | 8/1940 | Hawley | 210/525 |
| 2,253,500 | 8/1941 | Arango | 210/525 |
| 2,307,154 | 1/1943 | Osuna | 210/525 |
| 2,488,851 | 11/1949 | Copp | 210/525 |
| 2,536,729 | 1/1951 | Diaz-Compain | 210/525 |
| 2,593,036 | 4/1952 | Koch | 210/525 |
| 2,604,443 | 7/1952 | Fipps | 210/525 |
| 2,758,875 | 8/1956 | Loveless | 299/69 |
| 2,780,362 | 2/1957 | Sabi | 210/521 |
| 2,809,933 | 10/1957 | Halvorson | 210/151 |
| 2,821,306 | 1/1958 | Davila | 210/525 |
| 2,876,863 | 3/1959 | Kivari | 210/776 |
| 2,881,923 | 4/1959 | Nelson | 210/525 |
| 3,192,155 | 6/1965 | Bready et al. | 210/705 |
| 3,279,606 | 10/1966 | Cox | 210/539 |
| 3,341,450 | 9/1967 | Ciabattari et al. | 210/151 |
| 3,371,033 | 2/1968 | Simmons et al. | 210/220 |
| 3,535,236 | 10/1970 | Travis | 210/DIG. 9 |
| 3,815,775 | 6/1974 | Strunc et al. | 220/220 |
| 3,890,231 | 6/1975 | LaClair et al. | 210/199 |
| 3,917,104 | 11/1975 | Rossitto et al. | 220/18 |
| 4,046,693 | 9/1977 | Glover | 210/195 S |
| 4,710,292 | 12/1987 | Devos | 210/539 |
| 4,790,447 | 12/1988 | Lenny | 210/DIG. 9 |
| 4,844,800 | 7/1989 | Brucker | 210/195.3 |
| 5,139,662 | 8/1992 | Ozawa | 210/221.2 |
| 5,212,090 | 5/1993 | Landine et al. | 220/218 |
| 5,305,904 | 4/1994 | Cutts | 220/216 |

FOREIGN PATENT DOCUMENTS

| | | | |
|---|---|---|---|
| 592625 | 2/1960 | Canada | 220/227 |
| 2410883 | 9/1975 | Germany | 210/916 |

OTHER PUBLICATIONS

Pacific Flush Tank Company Bulletin No. 332, pp. 1–40, 1953.
"Texas Operations Wastewater Treatment Plant Dow U.S.A." Mar. 1992.

*Primary Examiner*—Joseph W. Drodge

[57] ABSTRACT

A clarifier is disclosed with a cover or roof configured and disposed to minimize headspace between a top level of liquid in a clarifier vessel and a bottom of the roof. In one aspect the roof or cover includes one or more removable panels which permit access to a clarifier vessel's interior; the panels removably secured to a purlin system which is connected to a truss support secured to the vessel. In one aspect one or more circumferential purge air inlets are provided through which flow purge air. Purge air and gaseous material emitted from a mixture in the clarifier flow to a vent or vents through which they exit the clarifier. In one aspect the air inlet or inlets are disposed to provide uniform flow from the inlets to the vents. In one aspect one or more roof panels is connected with a known force and has a known rupture strength so that before explosive damage to other parts of the clarifier the panel is explosively disconnected and ruptured to relieve pressure in the clarifier. Also disclosed is a cover or roof for a clarifier vessel.

19 Claims, 4 Drawing Sheets

SLUDGE CLARIFIER ROOF WITH CENTRAL COLUMN SUPPORT

BACKGROUND OF THE INVENTION

1. Field of the Invention

This invention is related to clarifiers, and, in one aspect to a cover or roof for a clarifier vessel.

2 Description of Related Art

Clarifiers are used to separate suspended solids from a liquid in which they are suspended. A typical clarifier has a vessel for holding the liquid and, in some cases, a skimmer, or rake mechanism which facilitates movement of the solids upwardly so that a clear liquid remains. A wide variety of liquids are clarified, including liquids which emit gasses and vapors. Such emitted gasses and vapors are contained within the clarifier vessel.

A variety of problems result from the containment of such gasses and vapors and from their accumulation within a clarifier vessel. The gasses and vapors (e.g. hydrogen sulfide and vapors with entrained salt) can damage clarifier internal parts and corrode the metals used for them. Without appropriate pressure relief for covered clarifiers, an explosive situation is possible; but often such pressure relief must be accomplished in an environmentally acceptable manner. Prior art dome clarifier covers provide a relatively large space above material to be clarified. A large volume of dangerous, toxic, and/or potentially explosive gasses or vapors from the material can accumulate in this space.

There has long been a need for a clarifier and a clarifier roof which facilitate the effective venting of gasses and vapors from a clarifier vessel. There has long been a need for a clarifier roof which permits easy access to the clarifier's interior. There has long been a need for a clarifier roof that accommodates skimming equipment within the clarifier. There has long been a need for a clarifier with such apparatus. There has long been a need for a clarifier with minimal headspace.

SUMMARY OF THE PRESENT INVENTION

A clarifier according to one aspect of this invention is disclosed which has a clarifier vessel for holding material to be clarified; skimming apparatus in the vessel to facilitate solid-liquid separation; a roof or cover for enclosing a top opening of the vessel; and vent apparatus for venting gasses and vapors from the material. In one particular aspect the roof of this embodiment is relatively flat and is disposed near a top level of liquid in the vessel to minimize headspace between the liquid and the roof. In one embodiment appropriate seals are provided at the interface of the roof and skimmer rotating apparatus. Preferably, emitted gasses and vapors are drafted from the material to a centrally located vent or vents. Most preferably an air inlet opening extends around the entire circumference of the roof, or there are a plurality of spaced-apart air inlets, and a vacuum provided at a centrally located vent causes uniform air flow and, hence, uniform movement of gasses and vapors from the clarifier vessel's periphery to the central vent point. In one aspect the removable panel or panels are removably secured to a support system such as a system of interconnected purlins and the purlin system is secured to a truss support system which itself is secured to the vessel. Parts are made, preferably, from corrosion resistant plastic and metal materials.

It is, therefore, an object of at least certain preferred embodiments of the present invention to provide:

New, useful, unique, efficient, non-obvious clarifiers and clarifier covers or roofs;

Such a clarifier with a roof that minimizes interior headspace between the roof and liquid to be clarified;

Such clarifier roofs with one or more moveable access panels for easy access to interior parts, weirs, troughs, connections, seals, and other internal items;

Such clarifiers with roofs that accommodate rotating skimmers and parts thereof;

Such clarifiers which overcome problems with prior art clarifiers, particularly vapor containment and emission, in an environmentally acceptable manner;

Such clarifiers and roofs which provide a uniform flow of inlet air and a uniform flow of gaseous/vaporous material from the vessel to a vent or vents which are centrally located on the roof; and Such clarifiers and roofs with parts made from corrosion resistant materials.

This invention resides not in any particular individual feature, but in combinations of them herein disclosed and claimed and it is distinguished from the prior art in these combinations with their structures and functions. There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that conceptions, upon which this disclosure is based, may readily be utilized as a basis for the designing of other structures, methods and systems for carrying out the purposes of the present invention. It is important, therefore, that the claims be regarded as including any legally equivalent constructions insofar as they do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED

AT THE TIME OF FILING FOR THIS PATENT

Figure 1:
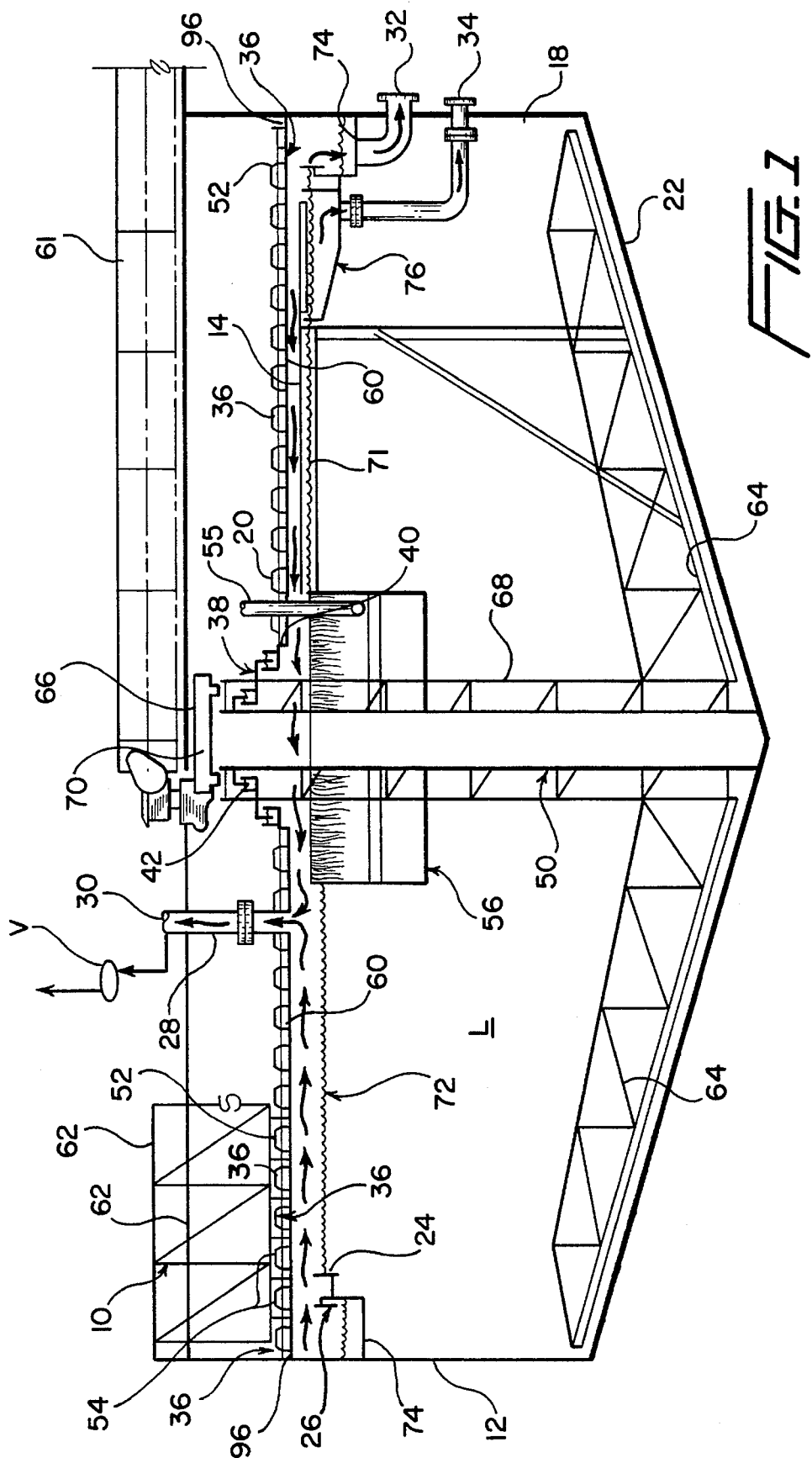
FIG. 1 is a side cross-sectional view of a clarifier and roof according to the present invention along line A—A of FIG. 2.
Figure 2:
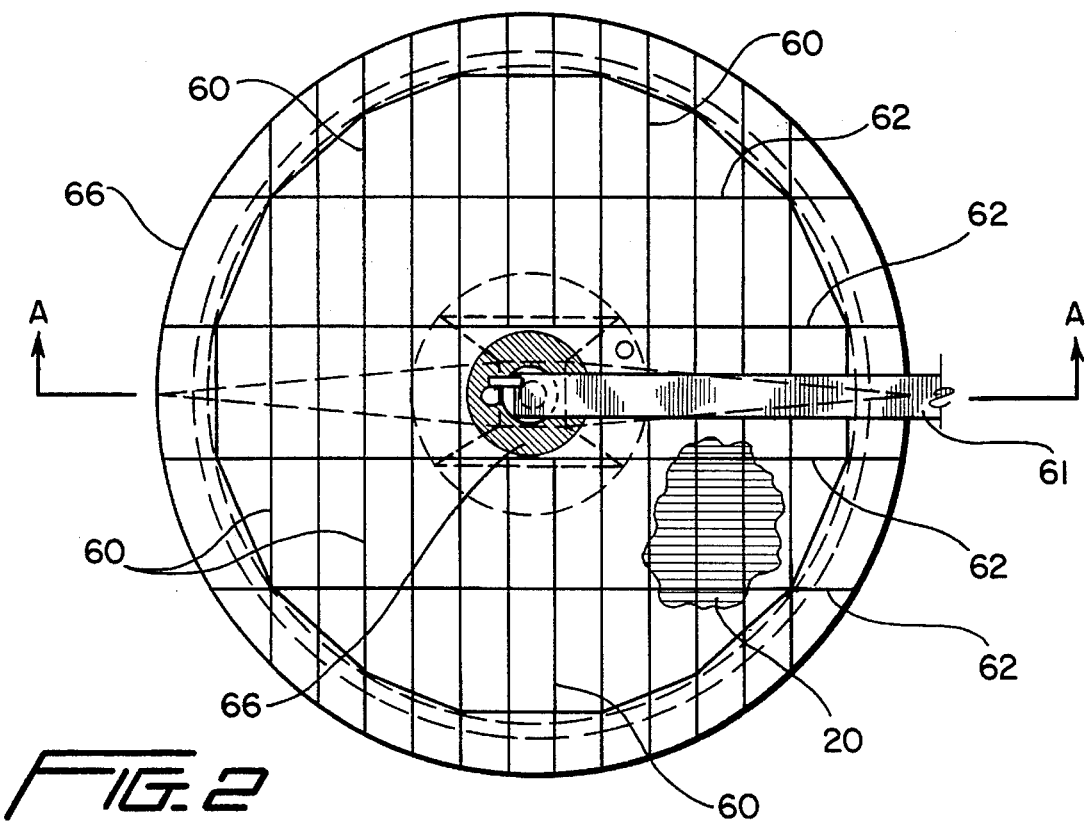
FIG. 2 is a top plan view of the apparatus of FIG. 1.

Referring now to FIGS. 1 and 2, a clarifier 10 according to this invention has a liquid holding vessel 12 with a side wall 18 and a bottom wall 22. A skimmer 14 secured to a central support 68 is rotatably disposed in the vessel 12 to rotate about a stationary central column 50. Rotating apparatus 70 rotates the skimmer 14; a center cylindrical feed well 56 (for reducing the input velocity of material fed into the vessel through a feed line 55) and which is mounted to the central cage 68; and rakes 64 which are also secured to the central cage 68. The rakes 64 help move material from the center to the outside of vessel. A liquid mixture L is present in the vessel 12 which includes suspended solids or other material to be separated from water or other liquid in the mixture. The liquid level is indicated by the numeral 72. Scum 71 accumulates at the top of the liquid.

A roof 20 encloses the top of the vessel 12. The roof 20 has a plurality of panels 52 and is supported beneath by a support system of purlins 60. The purlins 60 are supported by a peripheral flatbar 96 and by a truss support system 62 to which the purlins are secured. The truss support system 62 is secured to the vessel 12. (In FIG. 1 the truss system 62 is shown only partially.) A plurality of ridges creates spaces between the roof 20 and the vessel's interior periphery which provide purge air inlets 36, preferably uniformly spaced about the circumference of the vessel 12. In places where no ridges are present air inlet holes may be provided through the panels. Purge air is sucked through the inlets by a vacuum applied by a vacuum device to a vent outlet 30 of a vent 28 mounted through the roof 20. Gaseous materials, e.g. gasses and/or vapors from the mixture L are drawn with the purge air to the vent 28. Although the gasses etc. may be vented to atmosphere, undesirable gasses etc. may be vented to appropriate vent treatment apparatus (not shown).

Clear clarified liquid flows over a weir plate 26 into a trough 74 and exits the vessel through a clears outlet 32. Suspended solids, floating material, etc. (scum 71), flows to a scum trough 76 and exits the vessel through a skimmer outlet 34. A scum baffle 24 prevents scum from flowing to the weir plate 26.

A rotating cover 38 (See FIG. 3) secured to a top of the central cage 68 by a bar 69 provides a seal at the cover/roof interface. One water seal 40 seals the cover/roof interface and a second water seal 42 seals the cover/stationary column interface. A work platform 66 is provided at the top of the stationary column 50 and an access walkway 16 extends across the top of the vessel 12.

Figure 3:
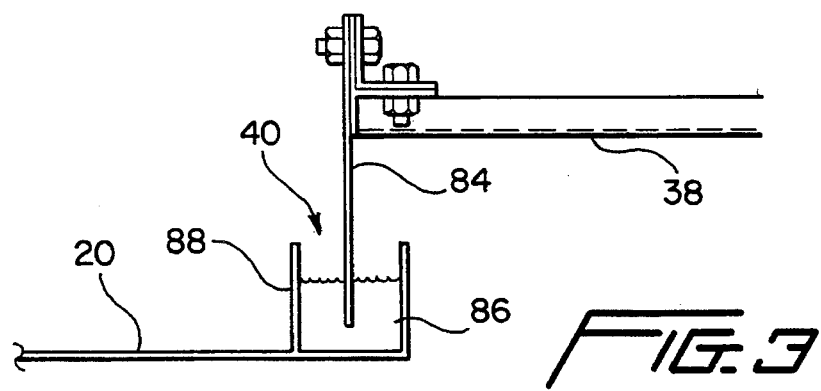
FIG. 3 is an enlarged view in cross-section of a liquid seal of the clarifier of FIG. 1.

FIG. 3 illustrates in enlarged detail the water seal 40. A descending member 84 of the cover 38 projects into water 86 in a reservoir 88 formed at an end of the roof 20. Similarly the water seal 42 (FIG. 1) includes a reservoir into which projects a descending member secured to the stationary column.

Figure 4:
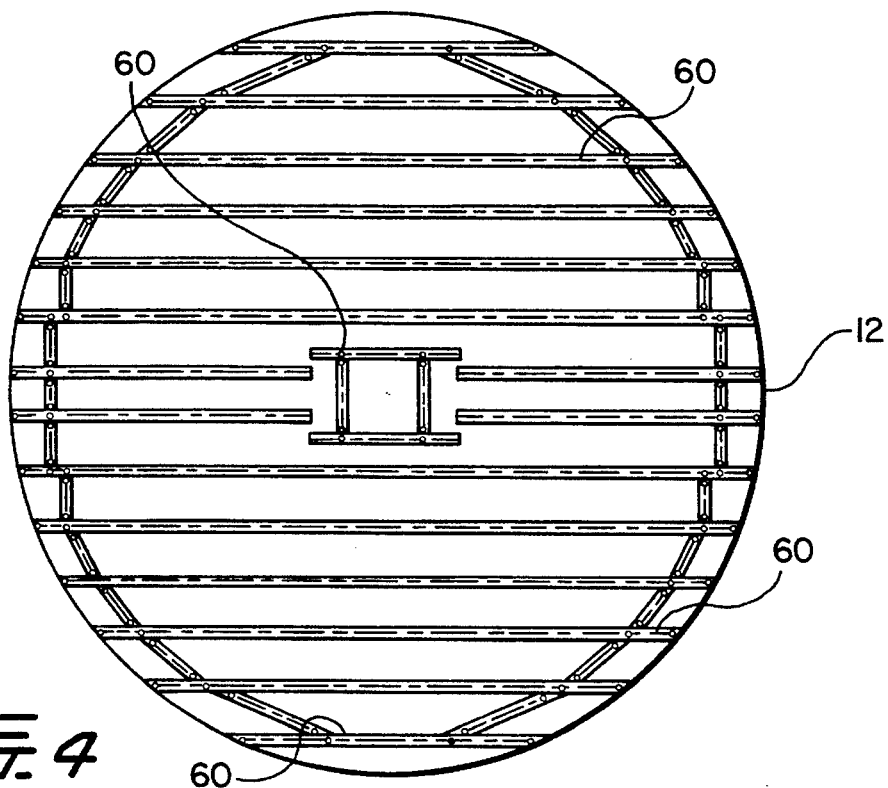
FIG. 4 is a top plan view of the purlin support for the roof of the clarifier of FIG. 1.
Figure 5:
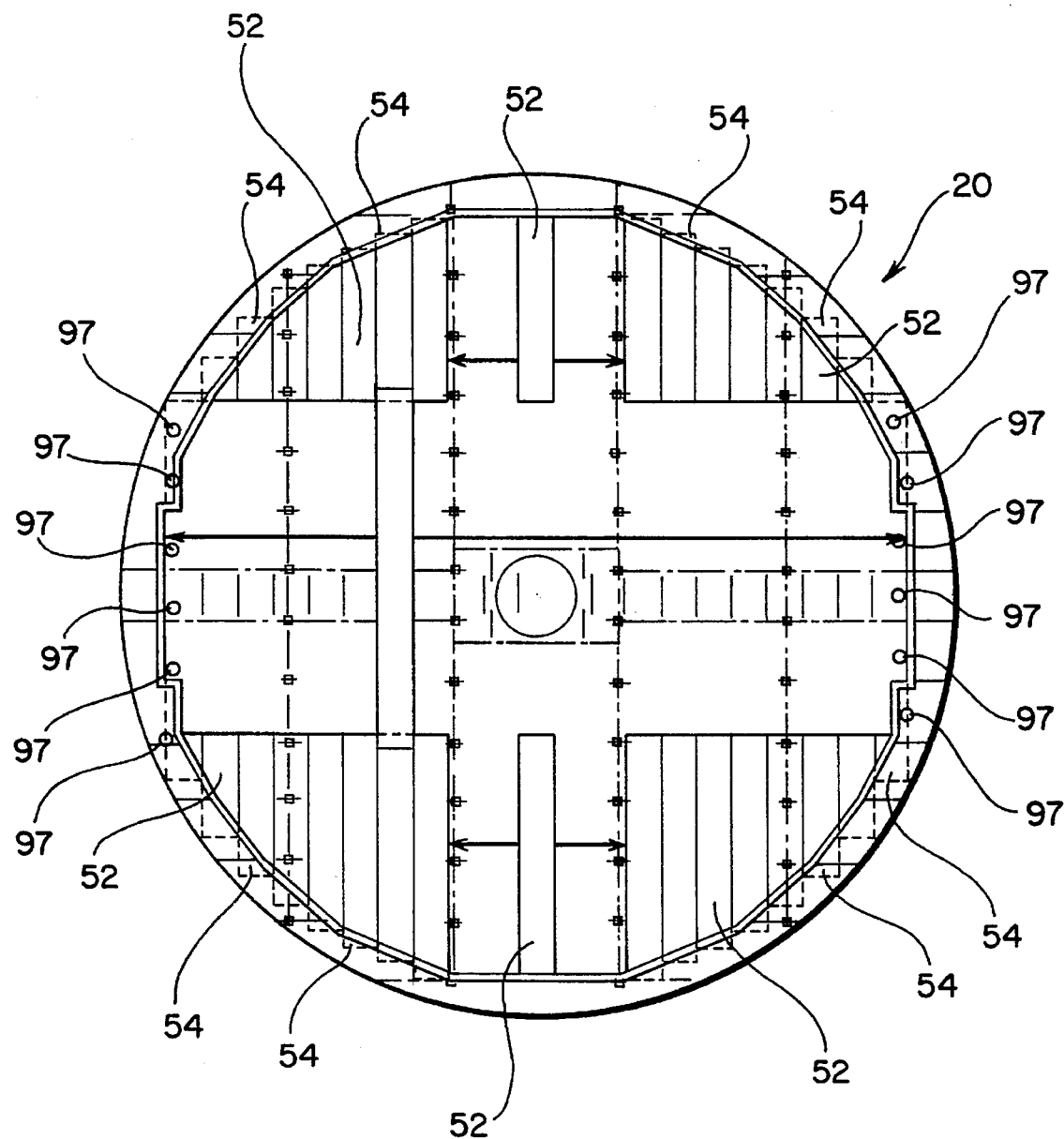
FIG. 5 is a top plan view of the panels of the roof of the clarifier of FIG. 1.

FIG. 4 shows the purlin supports 60 in detail and FIG. 5 shows the panel system for the roof 20. In FIG. 2 the purlin support system is indicated by the vertical lines (some with the identifying number 60) and the truss system is indicated by four horizontal lines 62. Easily removable panels 54 around the roof periphery provide access to the vessel 12's interior. It is within the scope of this invention for one, some, or all panels to be removable. Not all panels are shown in FIG. 5; arrows extending from certain panels indicate that remaining space is covered by similar panels.

It is preferred for a clarifier according to this invention with a vessel 85 feet in diameter, that the height of headspace between the liquid level 72 and a bottom surface of the roof 20 be no more than two feet and preferably no more than 1.5 feet. For such a volume it is preferred that the vent apparatus be able to remove at least 300 cubic feet of gas or vapors per minute and 1,000 cubic feet per minute under an upset condition (e.g. an amount of gas/vapor exceeding an analyzed lower explosive limit).

In one embodiment it is preferred that the purlins be made from fiberglass reinforced plastic; the truss support be made from galvanized steel, the roof panels be made from lightweight fiberglass; and fasteners made from stainless steel or monel. Panel removability is provided in certain embodiments by employing externally bolted steel angle irons which hold roof panels in . position on the purlins, but are easily removed and set aside (e.g. using only two bolts and two nuts per each angle iron).

To provide a uniform flow of air from an outer periphery of the cover to a centrally located vent (e.g. vent 28, FIG. 1) or vents, a single strip opening is provided about the cover's outer periphery or a plurality of spaced-apart air inlets are uniformly disposed about the outer periphery. In those embodiments employing corrugated or ridged roof panels, if the panels are disposed in side-by-side alignment, at those locations on the periphery where there is no ridge opening holes through the panels as indicated by the holes 97 in FIG. 5 may be employed to facilitate a uniform flow of materials—air, gasses, vapors—from the vessel's interior to the vent(s). With non-ridged panels, holes may be provided through the panels all around the periphery of the cover; or with solid panels, a hole or holes may be provided in the flatbar 96.

Figure 6:
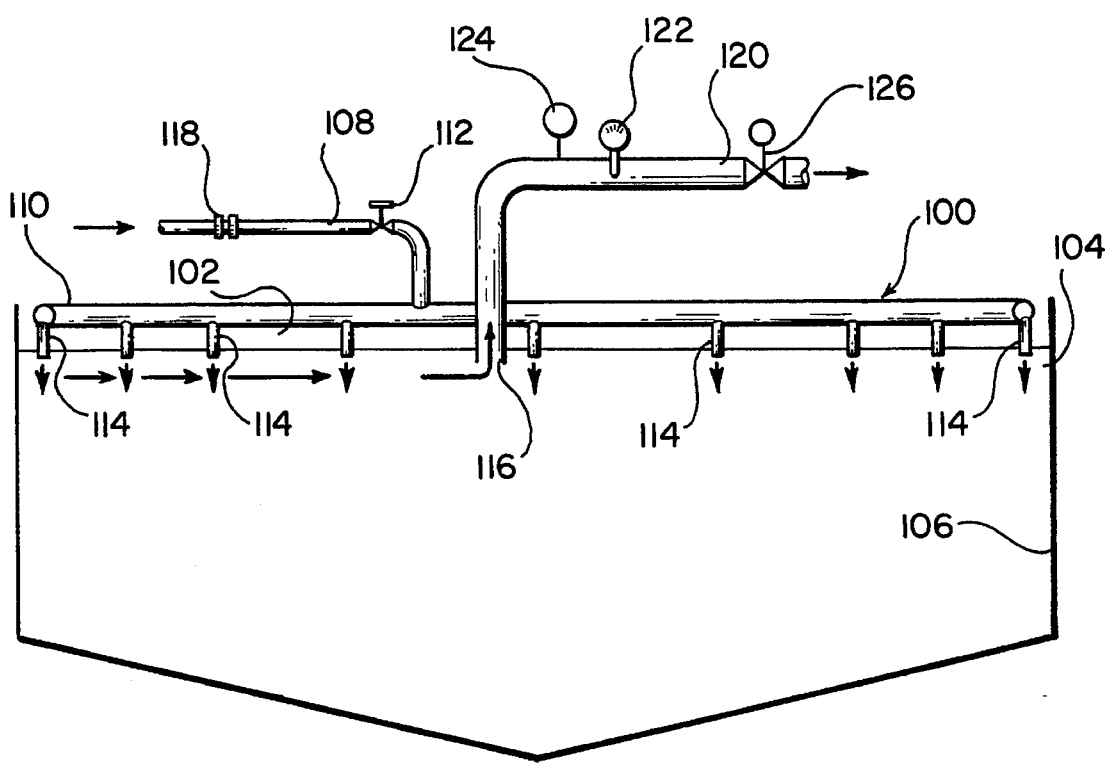
FIG. 6 is a side cross-sectional view of a clarifier according to the present invention.

FIG. 6 illustrates a clarifier 100 according to the present invention with a cover 102 according to the present invention. The cover 102 is sealingly secured over a top 104 of a clarifier vessel 106. A purge gas, e.g. but not limited to air or an inert gas such as nitrogen, flows through a line 108 to a circumferential header 110 around the cover 102. A regulator valve 112 controls flow in the line 108. The purge gas then flows out from the header 110 through outlets 114. In one embodiment these outlets 114 are spaced uniformly apart about an outer periphery of the cover 102 to facilitate uniform introduction of purge gas into the vessel 106 and uniform movement of purge gas and gaseous or vaporous materials from within the vessel to a vent opening 116. A flow transmitter 118 may be used in the line 108 to measure gas flow. A vent line 120 communicates with the vent opening 116. A flow controller regulator valve 126 and flow meter 122 on the line 120 preferably control flow through the line 120 at a rate slightly higher than the rate at which purge gas is introduced into the vessel 106 to minimize or eliminate emissions from the vessel 106 to the atmosphere. An analyzer 124 senses the percent of lower explosive limit attained in the vessel 106 and signals to begin the flow of inert purge gas into the vessel when a certain pre-set percentage is exceeded. In another aspect, purge gas is introduced into the vessel 106, filling the space between liquid in the vessel and the bottom of the cover 102 with a gas pad of a desired known pressure. A regulator valve 126 on the vent line 120 is pre-set to open when pressure in the vessel 106 builds up and exceeds a desired limit, e.g. some percentage of a pressure limit in the vessel as dictated by water seal or roof design. For example, pad gas may be added to the vessel through the regulator valve 112 at one-half inch water column pressure while the regulator valve 126 vents at two inches water column pressure. The use of inert purge gas reduces or eliminates oxygen from the vessel's headspace, thereby reducing the potential for an explosion or fire.

If the cover 102 is as previously described herein with water seals and removable panels, such panels and/or seals provide explosion relief with minimal damage to a vessel. Panels can be connected to a panel support system with connectors of known strength correlated to forces exerted by gas within a vessel so that the panels are disconnected prior to damage to the other parts of the vessel and explosive force is vented before it builds up sufficiently to damage vessel walls, mechanisms, etc. Also, one or more of the panels themselves of known structural and/or rupture strength may be employed which will rupture to relieve pressure in a vessel. The water seals provide a significant relief area for the vessel which, when once used in the event of a pressure upset, is simply refilled with water with little or no damage to the clarifier.

Filed on even date herewith are the following applications, co-owned with this application, whose subject matter is hereby disclosed herein and which may be employed with the present invention in a material treatment system (invention titles followed by applicant(s) name):

"Sludge Digestion;" U.S. Ser. No. 08/055,159; J. Stultz, D. Bice;

"Sludge Ammonia Removal;" U.S. Ser. No. 08/055,158; J. Stultz, D. Bice;

"Sludge Deodorization;" U.S. Ser. No. 08/055,157; J. Stultz, D. Bice;

"Tank Foundation;" U.S. Ser. No. 08/055,152; J. Stultz;

"Pipe To Concrete Transition;" U.S. Ser. No. 08/055,153; J. Stultz;

"Slab Joint Liquid Stop;" U.S. Ser. No. 08/055,156; J. Stultz;

"Sludge Clarifier Bottom;" U.S. Ser. No. 08/055,161; J. Stultz, H. Rabren;

"Hopper Liner;" U.S. Ser. No. 08/055,155; J. Stultz;

"Waste Gas Incineration;" U.S. Ser. No. 08/055,160; J. Stultz, D. Bice

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A clarifier for clarifying a liquid mixture, the clarifier comprising a vessel having a top, a bottom, and an interior defined by a side wall connected to a bottom wall, the clarifier vessel being for containing the liquid mixture to be clarified, a central support column centrally disposed within the vessel and extending from the bottom to the told of the vessel, the central column support being for supporting internal clarifier mechanisms, a cover for the clarifier vessel, the cover being secured to the vessel and comprising a main member with a plurality of individual panels one adjacent the other and support means for supporting the main member at the top of the vessel, the cover having an outer periphery and a central opening extending through the main member and through which the central support column extends, central vent opening means extending through the main member for venting gaseous material from within the vessel, and gas inlet opening means extending through the cover's outer periphery for gas entry into the vessel at the cover's periphery.

2. The clarifier of claim 1 wherein the panels are removably secured to the support means.

3. The clarifier of claim 1 wherein the central support column has column seal means and the cover further comprises cover seal means for co-acting with the column seal means so that the central support column extends sealingly through the central opening.

4. The clarifier of claim 3 wherein the cover seal means comprises a water seal reservoir on the main member which co-acts with the column seal means.

5. The clarifier of claim 1 wherein the main member has a plurality of ridges extending thereacross, each ridge defining a ridge opening at ends thereof, and the ridge openings providing air inlets at the cover's periphery.

6. The cover of claim 5 wherein application of a vacuum at the vent opening means outside of the vessel sucks air through the air inlets and sucks air and gaseous material from within the vessel out through the vent opening means.

7. The clarifier of claim 5 wherein the main member has a plurality of air inlets therethrough, the plurality of air inlets and the plurality of ridges being spaced apart about the periphery of the cover so that a uniform flow of air is provided from the periphery to the central vent opening means.

8. The clarifier of claim 1 wherein the main member is relatively flat.

9. The clarifier of claim 1 wherein substantially all parts thereof are made of corrosion resistant materials.

10. The clarifier of claim 1 wherein the vent opening means comprises a plurality of vent openings through the main member.

11. The clarifier of claim 1 wherein the gas inlet opening means comprises a plurality of air inlets uniformly spaced apart around the outer periphery of the cover 12. The clarifier of claim 1 wherein at least one of the panels is of a known rupture strength for rupturing when pressure within the clarifier vessel exceeds a known limit.

13. The clarifier of claim 1 comprising also purge gas introduction means for introducing a purge gas through the gas inlet means into opening the clarifier vessel.

14. The clarifier of claim 13 comprising also control means for controlling pressure in the clarifier vessel and for relieving pressure when pressure exceeds a known limit.

15. The clarifier of claim 1 wherein the panels are secured to the support means and at least one of the panels is removably secured to the support means and removable therefrom to allow access to the vessel's interior beneath the cover.

16. A clarifier for clarifying a liquid mixture, the clarifier comprising a vessel having a top, a bottom, and an interior defined by a side wall connected to a bottom wall, the clarifier vessel being for containing the liquid mixture to be clarified, a central support column centrally disposed within the vessel and extending from the bottom to the top of the vessel, the central column support being for supporting internal clarifier mechanisms, a cover secured to the clarifier vessel, the cover comprising a relatively flat main member comprising a plurality of individual panels one adjacent the other, the main member having an outer periphery and a central opening extending through the main member and through which the central support column extends, support means for supporting the main member at the top of the vessel, the panels secured to the support means, a tress secured to the top of the vessel, the support means being secured to and beneath the tress, a plurality of the panels being removably secured to the support means and removable to allow access to the vessel's interior beneath the cover, a vent opening centrally located on and extending through the main member for venting gaseous material from within the vessel, column seal means on the central support column and cover seal means on the cover for co-acting with the column seal means so that the central support column extends sealingly through the central opening, and a plurality of air inlet openings spaced apart about the outer periphery of the main member permitting a uniform flow of air to move into and through the air inlet openings, through the vessel, and to the vent opening.

17. A cover configured and arranged for securement at a top of a clarifier vessel, the vessel being for containing liquid material to be clarified and the vessel having a central support column for supporting internal clarifier mechanism and the cover having an interior, a side wall and a bottom, the cover being disposable above a top level of the liquid material and above a headspace of the clarifier vessel, the cover comprising a main member comprising a plurality of individual panels one adjacent the other, the main member having an outer periphery and a lower surface above the headspace of the clarifier vessel, the headspace extending from the outer periphery beneath the lower surface of the main member, support means for supporting the main member, the panels being secured to the support means, at least one of the panels being removably secured to the support means and removable to allow access to the vessel's interior beneath the cover, central vent opening means extending through the main member for venting gaseous material from within the vessel, a central opening extending through the main member and through which the central support column extends, the central support column having column seal means and the cover having cover seal means for co-acting with the column seal means so that the central support column extends sealingly through the central opening, gas inlet opening means for gas to enter the vessel, the gas inlet opening means comprising a plurality of individual gas inlets through the main member's outer periphery, the gas inlets being uniformly spaced apart around the outer periphery of the main member and the vent opening means being located centrally on the main member so that a uniform flow of gas flows from the gas inlets through the headspace to the vent opening means.

18. A cover configured and arranged for securement at a top of a clarifier vessel, the vessel being for containing liquid material to be clarified, the vessel having a headspace, a side wall, a bottom, and an interior, the vessel having a central support column for supporting internal clarifier mechanism, the central support column having column seal means, a side wall and a bottom, the cover disposable above a top level of the liquid material and above the headspace of the clarifier vessel, the cover comprising a main member comprising a plurality of individual panels one adjacent the other, the main member having an outer periphery and a lower surface above the headspace of the clarifier vessel, the headspace extending from the outer periphery beneath the lower surface of the main member, support means for supporting the main member, the panels secured to the support means, central vent opening means extending through the main member for venting gaseous material from within the vessel, gas inlet opening means extending through the main member's outer periphery for gas entry into the clarifier vessel at the main member's outer periphery and for flow through the headspace and thence to the central vent opening means, a central opening extending through the main member and through which the central support column extends, and cover seal means for co-acting with the column seal means so that the central support column extends sealingly through the central opening.

19. The cover of claim 18 wherein the cover seal means comprises a water seal reservoir on the main member for co-acting with a seal member on the central support column.

* * * * *